United States Patent
Cler

[11] 3,769,782
[45] Nov. 6, 1973

[54] CORN DETASSELING HEAD
[76] Inventor: Paul L. Cler, c/o Paul's Machine & Welding, Villa Grove, Ill. 61956
[22] Filed: Feb. 11, 1972
[21] Appl. No.: 225,476

[52] U.S. Cl. .................................... 56/51, 171/58
[51] Int. Cl. ............................................ A01d 47/00
[58] Field of Search ........................... 56/51, 63, 53; 171/58, 61

[56] References Cited
UNITED STATES PATENTS
| | | | |
|---|---|---|---|
| 2,660,013 | 11/1953 | Priestley | 171/58 |
| 2,924,283 | 2/1960 | MacPhee | 171/58 |
| 3,437,152 | 4/1969 | Barrentine | 171/58 |
| 2,124,309 | 7/1938 | Munsterman | 171/61 |
| 3,025,653 | 3/1962 | Ackerman | 56/63 |
| 2,163,849 | 6/1939 | Pfister | 56/51 |
| 2,397,249 | 3/1946 | Dostal | 171/58 |
| 3,422,610 | 1/1969 | Wetherell | 56/63 |

Primary Examiner—Antonio F. Guida
Attorney—Axel A. Hofgren et al.

[57] ABSTRACT

Corn detasseling apparatus for mounting on a vehicle frame to be moved thereby to a field of corn and detassel the same. The apparatus includes a pair of cleated tires in engagement with each other and driven in opposite directions so as to define a tassel receiving nip which may receive the tassel on a stalk of corn and move the same upwardly to pull it from the corn plant.

7 Claims, 3 Drawing Figures

Patented Nov. 6, 1973

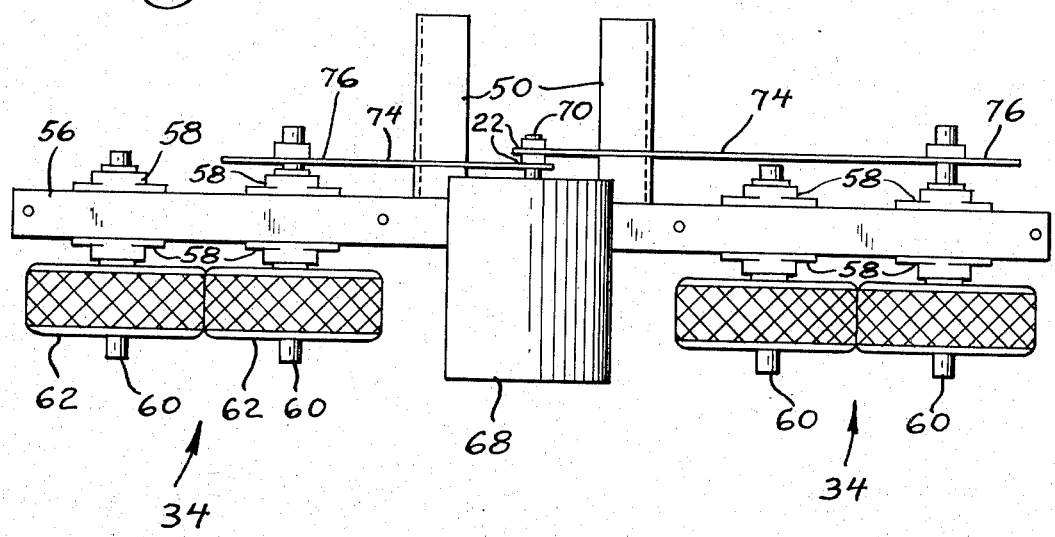
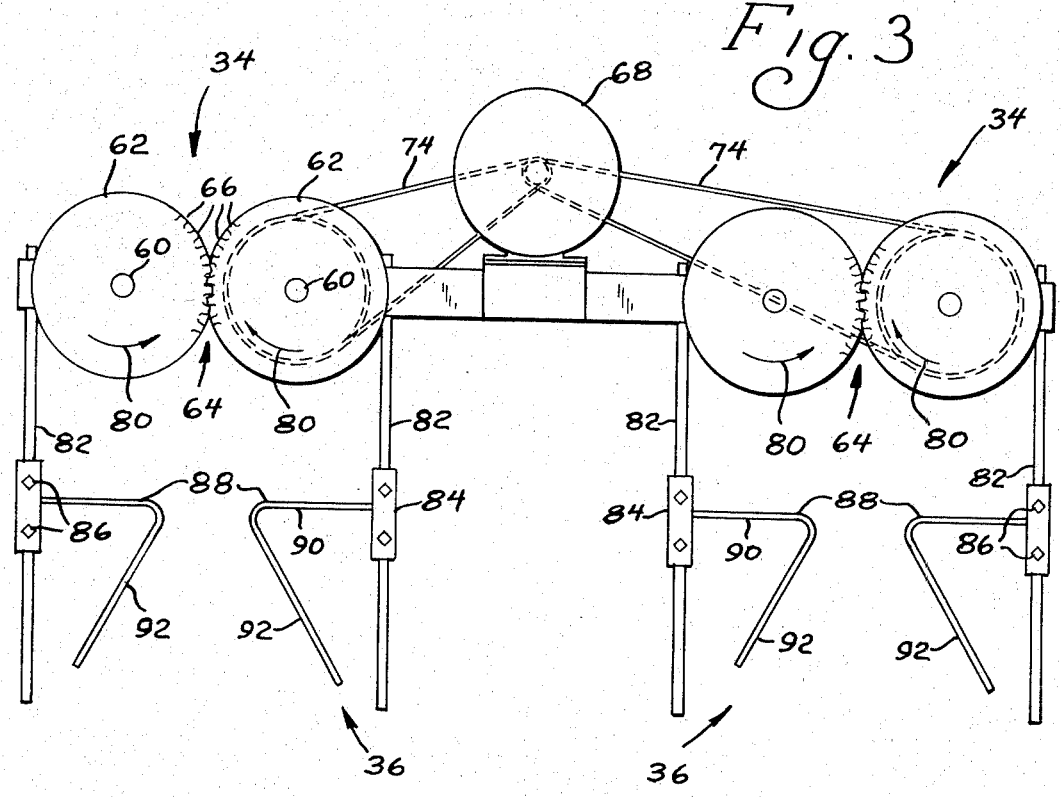

CORN DETASSELING HEAD

BACKGROUND OF THE INVENTION

This invention relates to corn detasselers.

For many years, it was common practice to detassel corn grown for seed purposes. Initially, this was accomplished by drawing a suitable vehicle through a corn field to be detasseled with a number of laborers thereon. As the vehicle passed through the field, the laborers would reach out from the vehicle and manually pull the tassels from the stalks of corn.

Because of the amount of labor required, a number of proposals for accomplishing the job mechanically evolved. One such proposal is described in Pfister U.S. Pat. No. 2,163,849 while another is disclosed in Spry U.S. Pat. No. 3,524,308.

The Pfister apparatus employed a pair of wheels in engagement with each other arranged to define a nip which would receive the tassel and remove the same from the stalk. However, for a variety of reasons, the same was inefficient and, to applicant's knowledge, was not put to any substantial commercial use.

The Spry apparatus involved the use of belts to define a tassel pulling nip and by reason of its construction, and the need for not pulling leaves from the stalk as well as the tassel, Spry employed a pair of drumlike structures to move the leaves of the stalk downwardly to fully expose the tassels to the nip and spread the leaves so that the tassel alone would be pulled. As a result, the Spry apparatus is cumbersome and unduly complicated mechanically.

Other approaches have been taken as well. For example, one machine in use is somewhat like that disclosed in Ackermann U.S. Pat. No. 3,025,653 wherein blades like those employed in a rotary lawn mower were used to cut the tassels from the stalk. The difficulty with such machines is that the height of the base of a tassel will vary from plant to plant so that oftentimes, and before an adjustment in the height of the cutter could be made, portions of the tassel on certain plants would be left, thus defeating the objective of complete tassel removal.

Other apparatus for pulling stalks or the like, such as that disclosed by Barrentine, U.S. Pat. No. 3,437,152, simply are not suitable, for any of a variety of reasons, for use in corn detasseling operations.

SUMMARY OF THE INVENTION

It is the principal object of the invention to provide a new and improved corn detasseling apparatus. More specifically, it is an object of the invention to provide a new and improved corn detasseling apparatus that is simple in construction and positive in its operation.

The exemplary embodiment of the invention achieves the foregoing objects by means of a construction including a wheeled frame adapted to be propelled through a field. Mounted on the frame is a parallelogram linkage which, at one end, supports one or more detasseling heads. Each detasseling head is defined by a pair of tires arranged for rotation about parallel axes and in engagement with each other. The axes of rotation of the tires are at an angle in the range of 40° to 50° with respect to the horizontal and extend in a vertical plane encompassing the direction of movement of the vehicle.

Preferably, the tires are cleated and the cleats are such as to mesh when the tires are rotated to provide positive gripping action for tassels as the vehicle travels through a corn field.

A hydraulic cylinder is operatively associated with the parallelogram linkage so that the height of the detasseling heads associated therewith above the ground may be easily controlled and/or changed as field conditions dictate and each detasseling head further includes forwardly extending guides adapted to guide corn stalks toward the detasseling nip of each detasseling head.

Other objects and advantages will become apparent from the following specification taken in conjunction with the accompanying drawings.

DESCRIPTION OF THE DRAWINGS

FIG. 2 is a view of a pair of detasseling heads; and

FIG. 3 is another view of the detasseling heads taken at an angle approximately 90° from the view illustrated in FIG. 2.

DESCRIPTION OF THE PREFERRED EMBODIMENT

Figure 1:
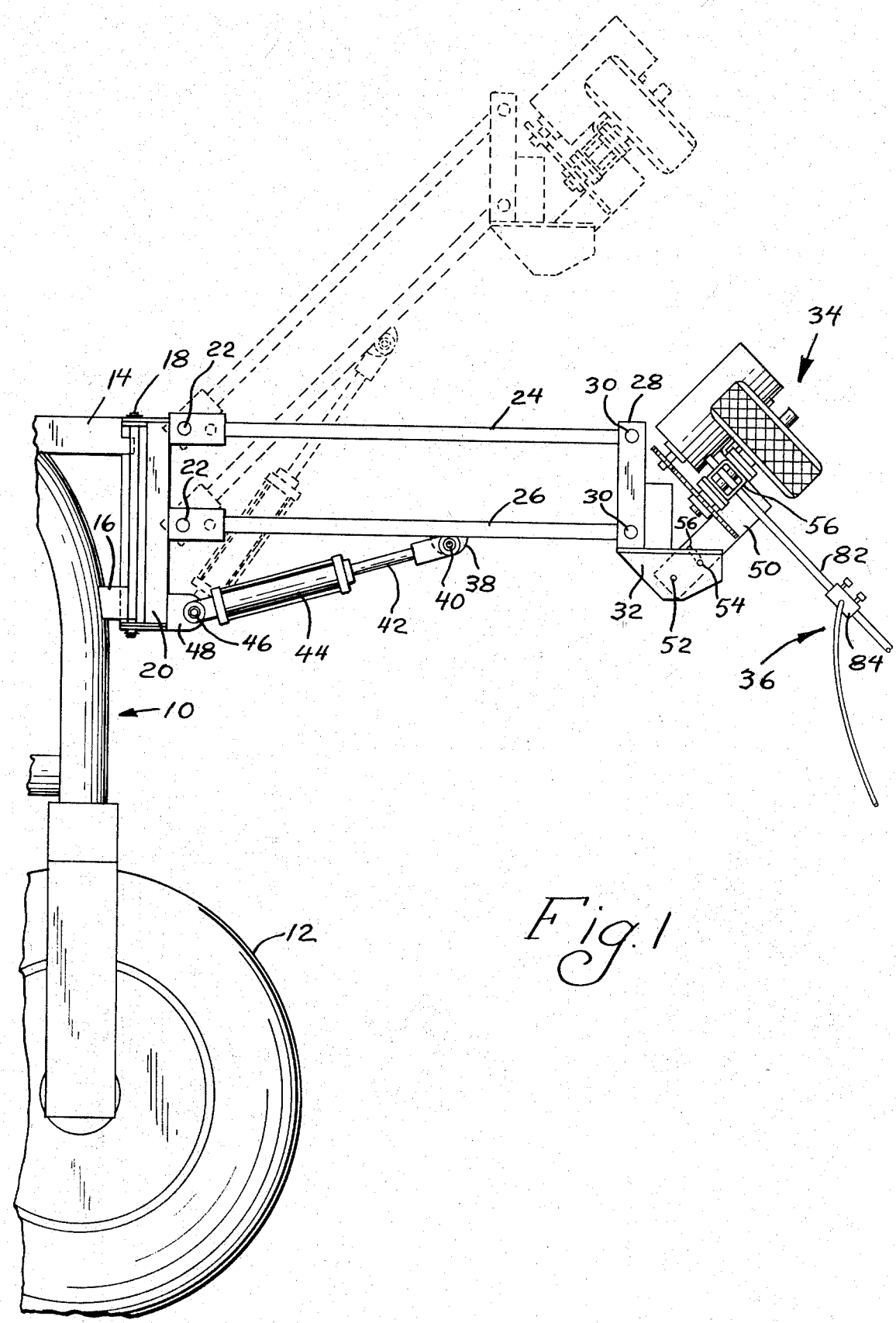
FIG. 1 is a fragmentary side elevation of a detasseling apparatus made according to the invention.

An exemplary embodiment of a corn detasseler made according to the invention is illustrated in FIG. 1 and is seen to include a vehicle frame, generally designated 10 (only part of which is shown) mounting a plurality of wheels 12 (only one of which is shown). The upper end of the frame 10 mounts forwardly projecting frame members 14 and 16 which pivotally mount a pin 18, a vertically oriented, rectangular frame 20.

The frame 20 in turn includes a pair of forwardly projecting, apertured lugs (not shown) on both of its vertically oriented members, each of which receives pivot pins 22 for pivotal connection to upper and lower pairs of arms 24 and 26 respectively. At the forwardmost ends of the pairs of arms 24 and 26 there are provided a pair of upright members 28 (only one of which is shown), which are connected to each other and to the pairs of arms 24 and 26 by pivot pins 30. As a result of the foregoing, the rectangular frame 20, the members 28, and the arms 24 and 26 define a parallelogram linkage which preferably is movable about 45° in either direction from the solid line position shown in FIG. 1 for purposes to be seen.

The upright members 28, at their lower ends, are secured to a horizontally extending base 32 which mounts one or more detasseling heads, generally designated 34, along with one or more stalk guide assemblies, generally designated 36.

Thus, the height of the detasseling heads 34 and the stalk guide assembldies 36, but not their attitude, may be selectively regulated by changing the position of the parallelogram linkage previously described. To permit easy adjustment, a cross member (not shown) extends between the arms 26 and mounts a depending, apertured lug 38 which is connected by a pivot pin 40 to the piston rod 42 of a conventional, single acting hydraulic cylinder 44. The opposite end of the cylinder 44 is connected by a pivot pin 46 to an apertured lug 48 on the lower horizontal portion of the rectangular frame 20. Thus, by applying fluid under pressure to the hydraulic cylinder 44, the linkage may be raised to the dotted line position illustrated in FIG. 1. When it is desired to lower the linkage, pressure is relieved and the assembly will lower under its own weight.

With reference now to FIGS. 1-3, inclusive, the detasseling heads 34 and the stalk guide assemblies 36 will now be described. A pair of mounting arms 50 extend upwardly and forwardly on the base 32 and are secured thereto by means of a pivot pin 52 and a pin 54 received in an arcuate slot 56. The length of the slot 56 and the location of the pins 52 and 54 with respect to each other is such that the angle of the arms 50 may be varied between 40° and 50° with respect to the horizontal. Any suitable means may be employed for holding the arms 50 at any position in between the limits of their range of movement.

Extending across the upper ends of the arms 50 is an elongated, rectangular tube 56. The tube 56 mounts, at spaced locations along its length, a plurality of bearings 58 which in turn journal shafts 60 which project upwardly and forwardly of the frame 10. The shafts 60 are arranged in parallel and in pairs and each in turn mounts an inflatable tire 62 of conventional construction. The pairing of the shafts 60 is such that the tires 62 of each pair will be in contact with each other to define a detasseling nip generally designated 64 (FIG. 3).

As best seen in FIG. 3, the tires 62 are of the type that include cleats such as the cleats 66 on the sides thereof. The cleats 66 are spaced a distance at least equal to the width of a cleat and engaging ones in the tires 62 are oriented with respect to each other such that the cleats 66 of one tire mesh with the cleats 66 of the other tire. In this regard, it is not necessary that the cleats across the entire width of the tire mesh, but only that the cleats at the side thereof do so.

The tube 56 also mounts an electric motor 68 which may be provided with electrical energy by a suitable generator mounted elsewhere on the vehicle frame 10. The motor 68 includes a conventional output shaft 70 which in turn mounts a pair of driving sprockets 72. The sprockets 72 have drive chains 74 chained thereabout. One of the drive chains 74 is also trained about a driven sprocket 76 secured to the shaft 60 of the left-hand detasseling head 34 while the other is trained about a similar driven sprocket 76 associated with one of the shafts 60 with the rightmost one of the detasseling heads 34.

As a result of the foregoing construction, one wheel 62 in each of the pairs will be driven and due to its engagement with the other wheel 62 of the corresponding pair, the latter will be driven as well. The arrangement is such that the wheels will be driven in the direction of the arrows 80 as illustrated in FIG. 3.

The stalk guide assemblies 36 are each comprised of a pair of forwardly and downwardly extending rods 82 secured to the tube 56 on opposite sides of the wheel 62 in each pair. Each rod 82 receives a sleeve 84 which may be moved along the length of the rod and secured in any position thereon by means of bolts 86. The sleeves 84 in turn mount guides 88 formed of rods and each including an inwardly directed portion 90 terminating in forwardly and outwardly diverging portion 92. As a result, as the vehicle progresses through a corn field and down the rows thereof, stalks will be guided inwardly to the detasseling nip 64 by the guide portions 92 at which time they will be firmly grasped by the meshing cleats 66 on the tires 62 of each detasseling head 34 and moved upwardly thereby to completely separate the tassel at its base from the stalk. Of course, if the height of the corn stalks varies along the length of the row, an easy adjustment may be made by means of the hydraulic cylinder 44.

It has been found that it is not necessary for the wheels 62 defining the detasseling nip 64 to grasp the tassels near their base in order to completely remove them. Rather, it is only sufficient that they grasp the tassels somewhere along their length and the resultant upward movement of the same will cause them to separate at their base from the remainder of the corn stalk. As a result, it is completely unnecessary to provide any means to move the leaves of the stalk downwardly and away from the tassel to preclude removal of any substantial number of the leaves from the stalk along with the detasseling process. Moreover, the arrangement insures the removal of the entire tassel in contrast to the partial removal often encountered with cutting type detasselers. More particularly, the invention has shown itself to be capable of detasseling 98.7 percent of the corn stalks subjected to its operation, a far better performance than can be obtained with other detasseling apparatus.

I claim:

1. A corn detasseling head comprising:
   a base;
   a pair of shafts on said base, said shafts being parallel and projecting upwardly and forwardly of said base;
   a pair of cylindrical elements, each mounted on a respective one of said shafts for rotation about its cylindrical axis relative to said base, the cylindrical surfaces of said cylindrical elements being in contact with each other to define a detasseling nip;
   cleat means on each of said cylindrical elements adjacent the cylindrical surfaces thereof, said cleat means including a plurality of protuberances on each cylindrical element and spaced uniformly about the cylindrical axis thereof to project outwardly from the cylindrical periphery thereof, the protuberances of one of said cylindrical elements meshing in gear-like fashion with the protuberances of the other cylindrical element; and
   means for oppositely rotating said cylindrical elements about their respective cylindrical axes.

2. A corn detasseling head according to claim 1 wherein said cylindrical elements are defined by inflatable tires and said protuberances are at the junction of the tire side walls and the fire tread.

3. A corn detasseling head according to claim 1 further including means for securing said base to the front of a wheeled vehicle such that said shafts project forwardly of the vehicle and upwardly therefrom at an angle in the range from about 40° to about 50° with respect to the horizontal.

4. A corn detasseling head according to claim 3 further including means for selectively varying said angle within said range.

5. A corn detasseling head according to claim 3 wherein said base includes a horizontally elongated member and said securing means includes a parallelogram linkage whereby the vertical position of said cylindrical elements with respect to a vehicle to which they may be secured may be varied without changing their attitude with respect thereto; and motor means operatively associated with said parallelogram linkage for selectively varying said vertical position of said cylindrical elements.

6. A corn detasseling head according to claim 5 wherein said cylindrical elements are defined by inflatable tires and said protuberances are at the junction of the tire side walls and the tire tread.

7. The corn detasseling head of claim 1 wherein said rotating means includes a motor drivingly engaging one of said shafts to rotate the same to thereby drive the cylindrical element; the other cylindrical element being driven in the opposite direction by reason of the meshing of the cleat means thereof with the cleat means of the other of said cylindrical elements.

* * * * *